(12) United States Patent
Li et al.

(10) Patent No.: US 6,205,418 B1
(45) Date of Patent: Mar. 20, 2001

(54) SYSTEM AND METHOD FOR PROVIDING MULTIPLE LANGUAGE CAPABILITY IN COMPUTER-BASED APPLICATIONS

(75) Inventors: Xiaofeng Li, Eatontown; Robert Lee Mitchell, Aberdeen, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/881,321

(22) Filed: Jun. 25, 1997

(51) Int. Cl.[7] .................................................. G06F 17/20
(52) U.S. Cl. ........................................................... 704/8
(58) Field of Search ........................ 704/1–8; 379/88.05, 379/88.06; 707/530, 536

(56) References Cited

U.S. PATENT DOCUMENTS

| | | | |
|---|---|---|---|
| 4,566,078 | * 1/1986 | Crabtree | 704/1 |
| 4,870,610 | * 9/1989 | Belfer | 704/1 |
| 5,412,712 | 5/1995 | Jennings | 379/88 |
| 5,416,903 | * 5/1995 | Malcolm | 704/8 |
| 5,434,776 | * 7/1995 | Jain | 704/8 |
| 5,499,335 | * 3/1996 | Silver et al. | 704/8 |
| 5,583,761 | 12/1996 | Chou | 704/8 |
| 5,664,206 | * 9/1997 | Murrow et al. | 704/8 |

OTHER PUBLICATIONS

William S. Hall: "Adapt Your Program For Worlwide Use wirh Windows Internationalization Support", Microsoft Sys. Journal., Nov./Dec. 1991, pp. 29–45.*

* cited by examiner

Primary Examiner—Forester W. Isen
Assistant Examiner—Patrick N. Edouard
(74) Attorney, Agent, or Firm—Gibbons, Del Deo, Dolan, Griffinger & Vecchione

(57) ABSTRACT

The present invention is a system and method for providing a multiple language capability in a computer-based target application such as a personal computer-based (PC-based) attendant console for a communications switching system. The multiple language capability of the present invention includes the ability to dynamically change language selections for the text-based information that is visually presented to a user of the target application, which includes commands, labels, status and error messages, help screens, and the like. Users can either select a pre-programmed standard language, customize any of the standard languages to create a modified version of the standard language, or create a new language. In one embodiment, a multiple language capable PC-based attendant console includes a programmable computer with a custom language development function, a privileged operations function for administrators, and an attendant operations function. The programmable computer is coupled to a communications switching system via an adapter means. Selecting an appropriate language for use in the target application is accomplished by retrieving a user profile for an attendant, displaying a current language selection for the attendant, modifying the current language selection by either selecting another standard language as a new language selection or by creating a custom language as the new language selection, and operating the system with the new language selection. In another embodiment, a network of PCs can provide attendant service to the switch simultaneously with several attendants logged into the system. Dynamic language selection changes are simultaneously made for any of the attendants.

35 Claims, 2 Drawing Sheets

SYSTEM AND METHOD FOR PROVIDING MULTIPLE LANGUAGE CAPABILITY IN COMPUTER-BASED APPLICATIONS

FIELD OF THE INVENTION

The present invention relates generally to the field of computer-based applications, and more particularly, to a system and method for providing multiple language capability in a computer-based application.

BACKGROUND OF THE INVENTION

A multiple language capability in computer-based products offers numerous advantages with regard to product marketability in the international sector. For example, a single version of a computer-based system which could provide visual presentations of text-based information (e.g., system commands, messages, etc.) in multiple languages could be sold in many different countries. This capability would be particularly valuable in the telecommunications industry where vendors need to keep product modifications to a minimum for communications systems that are used in many different countries.

Personal computer-based (PC-based) attendant consoles for communications switching systems are particularly well-suited for a multiple language capability because of the nature and extent of the human interface requirements. In its most generic form, the PC-based attendant console includes a PC connected to a digital communications protocol (DCP) device, such as a DCP telephone made by Lucent Technologies, Inc., which is connected via an adapter to a communications switching system under control. Application software for the console is often written for any number of operating system environments, one of the most common today being the Windows® operating environment. An attendant (also referred to as an operator) or a system administrator provides attendant support to the switching system using the DCP device (e.g., DCP telephone) for the voice-based functions in addition to using the console application software running on the PC platform for performing other required attendant functions. With the increased demand for communications systems in developing countries, companies would derive significant benefits by including a multiple language capability in the PC-based attendant console that accompanies the communications system. For example, the DEFINITY™ Communications System by Lucent Technologies, Inc. is one such system that would benefit from using such a PC-based attendant console. However, such a system has not yet been provided.

Some attempts have been made to incorporate a multiple language capability in PC-based applications, but most of these are complex or cumbersome solutions which cannot be easily implemented in a communications switching system environment. One of the more common implementations of a multiple language capability is a look-up approach in which the system retrieves stored language elements from a master database or dictionary. In the telecommunications field, voice messaging systems typically use the look-up approach implemented with several language specific databases, a system database, and a processor. Generally, the processor translates an identifier included in each message announcement to a set of rules (e.g., for sentence construction) which are stored in the system database. The rules associated with the desired language are then used to determine the set of language specific voice fragments to retrieve from the particular language specific database for playback to the user. Using this approach requires a separate language specific database for each desired language and a corresponding set of rules stored in the system database. Consequently, this type of system does not provide the capability to dynamically change or add new languages in an expedient manner. Moreover, these systems do not efficiently accommodate slight variations to existing standard languages which would prove helpful for creating dialects of a particular language without the overhead associated with adding a completely new language.

Some systems provide visual presentations of text-based commands and messages in multiple languages by performing the language translation outside of the target application. However, this approach requires an extensive master database and a complex set of procedures for learning and running the desired language. Moreover, these types of systems are generally only suitable for the large inventory, off-the-shelf software applications which use system commands that are directly compatible with the operating environment (e.g., WINDOWS®). As a result, these systems suffer the disadvantage of not being able to adequately intercept embedded text strings that are unique to a specific target application. As an example, a PC-based attendant console application includes many embedded text strings that could not be intercepted by these types of multiple language systems.

In most of the prior art multiple language systems, users are given a very limited set of standard languages from which to choose. Moreover, users cannot easily and readily create their own custom language or modify existing, standard languages. These systems also restrict users by generally providing only one opportunity prior to a login session to select a language. As a result, users of existing multiple language systems cannot dynamically and repeatedly change the interface language. The prior art systems and methods are also noted for not accommodating simultaneous multiple users using several different languages (e.g., each login session conducted in a different language).

Accordingly, there is a need for a multiple language system which can be used for PC-based consoles and which overcomes the shortcomings of the prior art systems.

SUMMARY OF THE INVENTION

The present invention is a system and method for operating a computer-based system in multiple languages and is particularly well-suited for a personal computer-based (PC-based) attendant console for a communications switching system. The multiple language capability provided by the present invention includes the ability to dynamically change language selections for the visual presentations of text-based information used in a target application running on the computer-based system. This text-based information includes commands, labels (e.g., button labels), status and error messages, help screens, and the like. Using the present invention, users can either select from standard languages which are pre-programmed into the system, customize any of the standard languages (e.g., to create a modified version of the standard language), or create a new language.

A method of operating the computer-based system with a multiple language capability according to the present invention includes the steps of storing selected segments of pre-programmed languages (e.g., standard language segments) in memory, retrieving a user profile for a selected user, displaying a current language selection for the selected user, modifying the current language selection by either selecting another standard language as a new language selection or by creating a custom language as the new language selection, and operating the system with the new language selection. Once selected, the new language is then used for the visual presentation of all commands, status messages, button labels, and the like that are needed by the user to run the target application.

In the present invention, dynamic changes can be simultaneously made to the language selections for more than one attendant without interfering with the operation of the system. For example, in one embodiment of the attendant console, a network of PCs can be "attending" the communications switching system simultaneously with several attendants logged into the system (one at each PC) with each attendant having the capability to change his or her language selection. Consequently, the multiple language capability in the present invention supports dynamic and simultaneous changes to the language selections without the need for a complicated pre-programming scheme or system-wide changes to a global database as is the case with the prior art systems.

As compared with the prior art systems, a custom language can also be created more efficiently and more expediently without the limitations of the prior art systems. Specifically, the present invention provides a more versatile approach for creating custom languages that are derivatives of existing standard languages without having to use a separate customized database. Furthermore, the present invention can be used in a dynamic environment in which a custom language is created at any point during system operation as opposed to having to pre-program the entire system in advance to accommodate the new rules and syntax of a newly created custom language.

BRIEF DESCRIPTION OF THE DRAWINGS

For a better understanding of the present invention, reference can be made to the following detailed description in conjunction with the accompanying drawings, with like elements referred to with like references, in which.

DETAILED DESCRIPTION OF THE INVENTION

Figure 1:
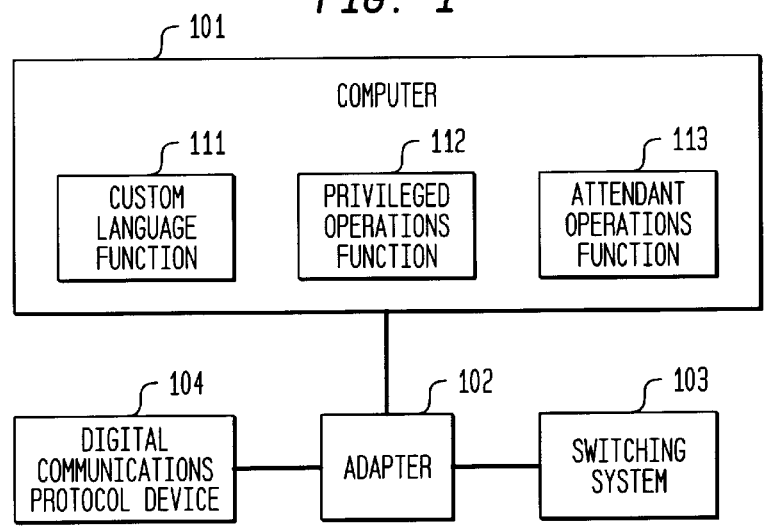
FIG. 1 is a block diagram of a system according to the present invention.

Although the present invention is particularly well suited to provide multiple language capability in a personal computer-based (PC-based) attendant console for communications switching systems, and shall be described with respect to this application, the system and method described herein can be applied to any number of computer-based applications in which it is desirable to provide visual presentations of text-based information (e.g., commands, labels, status and error messages) in multiple languages.

With respect to the terminology used throughout this specification, the term "administrator" refers to a system administrator who has the highest level of privileges (e.g., supervisory privileges) for managing the operation of the computer-based application, such as a PC-based attendant console application. The terms "attendant" and "operator" refer to an individual who operates the system with lesser privileges than the system administrator. The term "user" is used to refer to both the administrator and the attendant where a distinction is otherwise unnecessary (i.e., in the case where both the user and administrator would have privileges for a certain function). A "standard" language refers to any one of the languages supported without user translation (i.e., those pre-programmed into the system). A "complete" language refers to the "standard" languages as well as any language that has been created or modified by the user with all required translations. An "incomplete" language refers to any language that has been initiated, but is not complete (i.e., is missing one or more required translations).

In general, a PC-based attendant console must support languages other than English to be a truly global offering. More specifically, the PC-based attendant console must be capable of presenting all commands, labels (e.g., button labels), status and error messages, help screens, and the like in multiple languages so that the user can select his or her own language for operating the console application program. In addition to the standard languages which are specifically supported in the PC-based attendant console (i.e., those pre-programmed into the system), users should also be able to customize any of those standard languages already in the system, or alternatively, create and input a new language (i.e., a custom language). By way of example only, the system may offer standard languages such as English, Parisian French, Spanish, and German. The user could then operate the PC-based attendant console choosing one of these specifically-supported standard languages, or alternatively, he or she could either customize one of these languages (e.g., modifying Parisian French to Canadian French), or create an entirely new language (e.g., Polish). In general, a new or customized language is created by presenting the user with a sequential list of a fixed set of terms that are used for commands, button labels, status and error messages, and the like in any complete language (e.g., English or another language). The user then enters a substitute translation for any or all of the individual terms on the list. The resulting language can be named as the user sees fit, and becomes an option for the system default language as well as an option for individual attendants, provided that the resulting language is a complete language with all required translations.

Referring now to FIG. 1, a computer-based system is shown for providing multiple language capability in a PC-based attendant console. According to the present invention, the system includes a programmable computer 101 having a custom language development function 111, a privileged operations function 112, and an attendant operations function 113. These functions can be implemented in a computer program (e.g., console application program) executed by a processor (not shown) in the programmable computer 101. The PC-based attendant console also includes a communications device 104 to provide the voice-based attendant functions. For example, the communications device 104 can be a digital communications protocol (DCP) device. In a typical configuration, the programmable computer 101 and the communications device 104 are coupled to a communications switching system 103 via an adapter means 102.

In operation, the attendant or administrator uses the communications device 104 and the programmable computer 101 to provide the necessary attendant support to the switching system 103. In particular, the attendant or administrator uses the communications device 104 to perform the necessary voice-based functions of an attendant (e.g., operator) in conjunction with the programmable computer 101 which is used to run the console application program (i.e., target application). In the target application, the commands, button labels, status and error messages, and the like are represented by a fixed set of terms which must be presented to the user in the appropriate language for operation of the attendant console. In the present system, this information can be provided in any of a number of complete languages, which include standard languages, custom languages, or modified versions of the standard languages. Specifically, the standard languages are those which have already been pre-loaded and pre-formatted in memory (not shown) of the programmable computer 101. By way of example only, these may include English, Parisian French, or any other language included by the system designer. The custom languages are those which a user has created and saved into memory of the programmable computer 101 as a complete language. The modified standard languages are those created by the user by starting with a standard language and modifying accordingly. This latter type of language option is particularly useful for creating a slight variation or dialect of a standard language (e.g., creating a Canadian French from a Parisian French standard language). As will be described in more detail, the functions 111, 112, and 113 implemented within the programmable computer 101 are used to implement any of the various language options.

For clarity of explanation, the foregoing illustrative embodiment was described in terms of a programmable computer with various functions. By way of example, the functions may be implemented as computer program segments and each function may be presented to the user as a "window" in a system using a graphical user interface such as in Windows® -based systems. The functions may be provided through the use of either shared or dedicated hardware, including, but not limited to, hardware capable of executing software. Any use of the term "processor" should not be construed to refer exclusively to hardware capable of executing software. For example, illustrative embodiments may comprise microprocessor and/or digital signal processor ("DSP") hardware, read-only memory ("ROM") for storing software performing the various operations, and random access memory ("RAM") for storing results. Very large scale integration (VLSI) hardware embodiments, as well as custom VLSI circuitry in combination with a general purpose DSP circuit, may also be provided.

Figure 2:
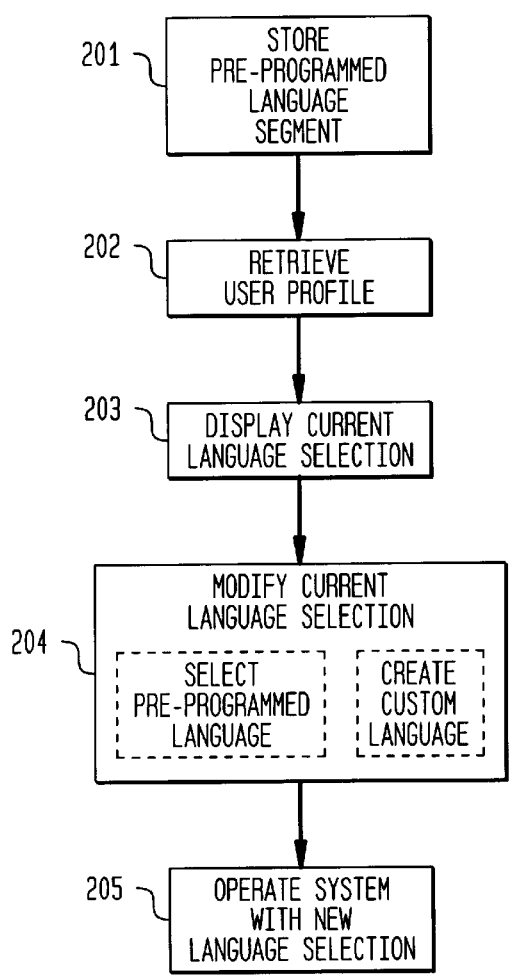
FIG. 2 is a flow diagram of a method according to the present invention.

Referring now to FIG. 2, a method of operating a computer-based system with a multiple language capability includes the steps of storing selected segments of a pre-programmed language (e.g., standard language segments) in memory (step 201), retrieving a user profile for a selected user (step 202), displaying a current language selection for the selected user (step 203), modifying the current language selection (step 204) during operation by either selecting another standard language as a new language selection or by creating a custom language as the new language selection, and updating the user profile with the new language selection so that the user can operate the system with the new language selection (step 205). In one implementation, the segments of the pre-programmed languages (standard languages) and segments of created or modified custom languages are stored in memory using a database application in order to facilitate efficient retrieval. Those skilled in the art will be able to identify many suitable database applications for this purpose, with one example being the Microsoft® Access database tool which is highly compatible with Windows®-based applications. The particular database implementation used in the present invention will be described below in more detail.

For purposes of this discussion, references to the current language refers to the language currently assigned to the user. Because a complete language includes any language that has a non-empty translation string assigned to each term, by definition, the current language and all standard languages are complete languages.

Figure 3:
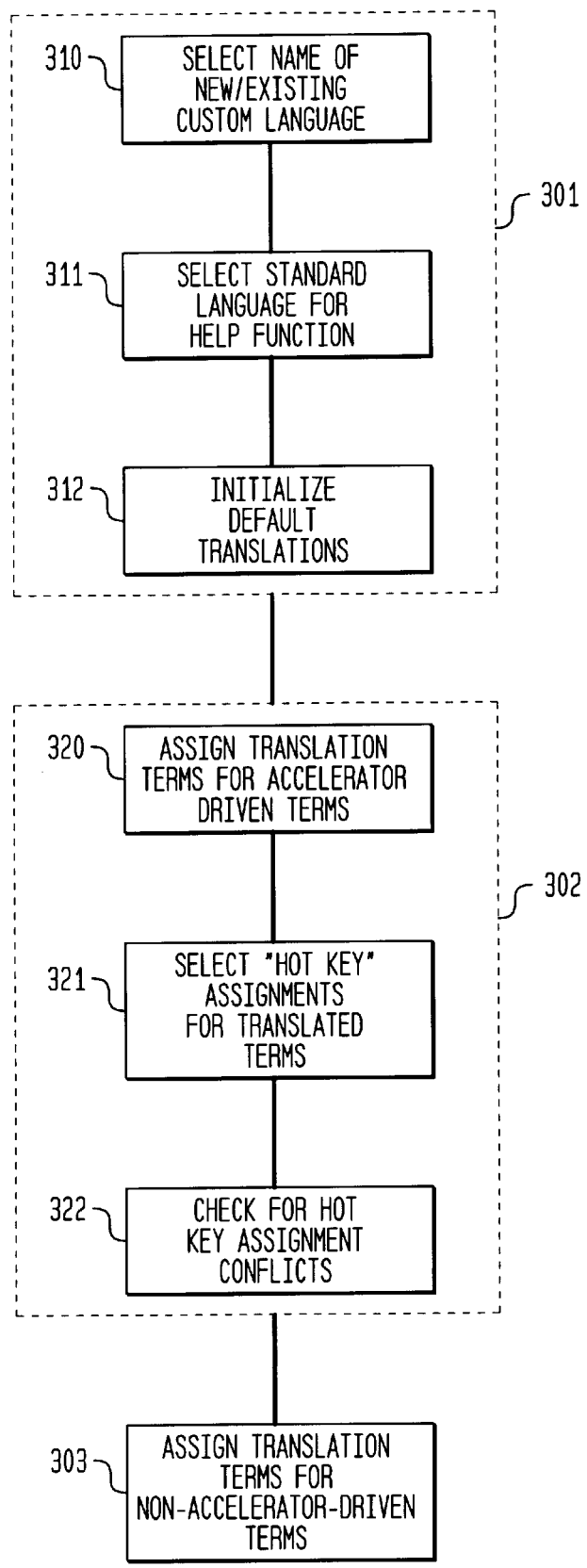
FIG. 3 is a flow diagram of the steps for developing a custom language using the method of the present invention.

The custom language development function 111 (FIG. 1) is the primary tool for managing the development and use of custom languages. More specifically, the custom language development function 111 is used for selecting, creating, modifying, or deleting custom languages. The steps for creating a custom language are shown in FIG. 3, and can be grouped within three functional categories, those being language naming 301, accelerator-driven terms assignment 302, and miscellaneous terms assignment 303.

Language naming (group 301) includes the steps of selecting a name for the custom language (step 310), selecting a language for the help screens from the list of standard languages (step 311), and initializing default translations for terms used for operating the system (step 312). In selecting a name (step 310), the user may enter text as desired to name the language, or instead may select any listed language (e.g., all custom languages, including incompletely defined languages). If the user selects a listed language, the user is presented with the text of all commands, button labels, status/error messages, and the like in a system default language and the translation fields are populated as completely as possible with pre-existing custom translations. If the user input does not match a name on the list and is not a standard language, the user input then becomes the name of a new language. The user may also delete a previously created custom language by selecting the name of the particular language, selecting delete, and confirming the deletion.

It should be noted that help screens are not presented for translation in step 311, but the user is instead presented with a listing of the standard languages that are pre-loaded and stored in memory. The user is then prompted to select one of the standard languages which then becomes associated with the custom language for presentation of the help screens only. This particular implementation of the help function is used in order to conserve memory and more efficiently utilize the hypertext features that are typically used with the help function. However, this implementation is just one of many suitable implementations for the present invention and those skilled in the art will understand that other modifications or variations are possible without departing from the spirit and scope of the present invention.

To initialize default translations in step 312, the user is presented with a list of all of the completed languages, including both the standard and the custom languages. By selecting one of the listed languages, the selected language's terms will be entered as the default translations for all terms used by the system. Otherwise, the user can choose not to select one of the listed languages, in which case the user must then provide his or her own translation in each of the blank entries for each of the terms used by the system. With this implementation, the user may easily and expeditiously create a modified version of an existing language, such as a variation of a standard language. By way of example only, a user can create a Canadian French custom language by naming the language accordingly and by initializing default translations to the Parisian French standard language. By doing so, all fields will be populated with the Parisian French translations of the terms used by the console and the user can then selectively modify individual terms as appropriate. Consequently, the user only has to change a few selected terms, rather than enter all new terms.

Assigning accelerator-driven terms (group 302) enables the user to translate terms for buttons and command bar elements, as well as to specify characters for "hot key" commands, also referred to as "accelerators", to correspond to the translated terms for the selected custom language. Some examples of common accelerator-driven terms used in the present invention as well as in most computer-based applications include commands/buttons such as "Quit", "Save", "Yes", "No", "Help", and the like. As is known in the art, accelerators are typically implemented in computer systems using "ALT", "CTRL", "ESCape", and other similar special function keys (e.g., "F1"). The execution of a text command using an accelerator generally involves simultaneously depressing a designated special function key in conjunction with another pre-designated key (e.g., "ALT-h" to pull down a "h"elp menu).

Assigning accelerator-driven terms (group 302) includes the steps of assigning translations for a given number of the fixed set of the terms which require an accelerator implementation (step 320), selecting a unique accelerator ("hot key") for each of the translated terms (step 321), and checking for conflicts among the accelerator assignments (step 322). More specifically, in step 320, the user specifies a custom language translation which is to be used as the translation for the current language term. Accelerator assignments are then assigned (step 321) for each of the terms in which a translation has been entered. In a typical system, the accelerator is assigned as a compressed keyboard sequence meaning that the user would only have to use a reduced number of keyboard strokes for executing the command as opposed to typing in the complete command. By way of example, in one implementation using the "ALT" key as the special function key, the user would specify one character in the translated term to be used in conjunction with the "ALT" key for implementing the text command. The accelerator assignments are checked (step 322) to verify that conflicting assignments have not been made. Accelerator conflicts would typically occur when the corresponding terms for a command appear simultaneously on a common screen (i.e., function) of the console target application. For example, "Save" and "Cancel", "Yes" and "No", "Add" and "Delete" are just a few examples of command pairs that may conflict because of simultaneous presentation to the user on a common screen or menu.

Assigning miscellaneous terms 303 enables the user to translate terms for all remaining messages, labels, and the like that do not require an accelerator assignment. Each of these miscellaneous terms (i.e., non-accelerator-driven terms) is presented to the user so that an appropriate translation corresponding to the user's custom language can be entered for each term. This step is carried out in a similar manner as previously described for assigning translations for the terms used for system commands (step 320). An example of some non-accelerator-driven terms in the attendant console may include "Calls Waiting", "Error: no record for this telephone number", "Save unsaved changes?", etc.

The above aspects of the present invention for providing multi-language and custom language capabilities can be implemented efficiently with a database application. In particular, the present invention utilizes three inter-related databases which include a language database, a translation database, and a conflicts database.

The language database contains two fields, those being a language name field and a corresponding field for a language code for each pre-programmed language and each custom language used in the attendant console. A simplified representation of the language database is shown below in Table 1 with the data fields represented in bold text and sample entries in italic font.

TABLE 1

| Language Name | Language Code |
|---|---|
| English | 00 |
| Parisian French | 01 |
| Canadian French | 09 |

As previously described, the attendant console is initially offered with a set of predefined (pre-programmed) "standard" languages, which by definition are "complete" languages. As the user defines new languages, a new entry is made in the language database and a unique language code is assigned to the new language. The contents of this and the other databases are stored in the memory of the computer as previously defined. Using Table 1 as an example, English and Parisian French could be the standard pre-programmed languages offered in the attendant console, while the Canadian French could be a custom language that was created using the steps of the present invention as previously described. In operation, when the system administrator assigns a language to an attendant, the appropriate language code is then associated with the attendant's profile. When the attendant subsequently executes a login, the console application program checks the attendant's profile and displays all screens (e.g., windows) in the proper language. It should be noted that the attendant is not allowed to select an incomplete language from the list.

The transform database contains three fields and is used for storing a unique translation code and a corresponding translation string for each term used by the attendant console. The translation strings include the selected segments of the pre-programmed languages as well as any of the translations entered for the custom languages. The translation database stores each translation code and the corresponding translation string according to the language code for each language supported by the attendant console. A simplified representation of the translation database is shown below in Table 2 with the data fields represented in bold text and sample entries in italic font.

TABLE 2

| Language Code | Translation Code | Translation String |
|---|---|---|
| 00 | 123 | &Help |
| 00 | 125 | &Save |
| 00 | 137 | Cance&l |
| 01 | 123 | &Aide |
| 01 | 125 | &Mem |
| 01 | 137 | Annu&ler |

In general and as previously described, translations must be provided in each supported language for the set of terms (e.g., words, phrases, or sentences) that are used by the attendants in the console application program. As shown in Table 2, each term is assigned a unique translation code which is language independent. For example, translation code 137 represents the cancel command used in the attendant console. The translation string field is populated with the corresponding translation for the term in each of the supported languages. For example, for language 00 (English), the translation string is "Cancel". For language 01 (Parisian French), the corresponding translation string for the same translation code 137 is "Annuler". Consequently, the language code contained in the particular attendant's profile determines which translation string will appear on the attendant's screen for the particular command. An attendant with language code 00 in his or her profile will see "Cancel" whereas an attendant with language code 01 will see "Annuler".

In the above example, the ampersand symbol ("&") is used to indicate which character in a given word or phrase is to be presented as underlined to the user (i.e., presented to the user as a "hot key" or accelerator as previously described). Those skilled in the art will recognize that the ampersand convention is a standard technique in Windows® programming. It should also be noted that both accelerator-driven terms (e.g., "&Save") and non-accelerator-driven terms (e.g., "Error: Specified language is incomplete and cannot be assigned") use the same procedure with respect to the translation database.

The conflicts database contains two fields and is used for storing pairs of translation codes for accelerator-driven terms that appear simultaneously in common menus/screens of the attendant console. For example, in response to a query from the attendant console, an attendant may be asked to select the "Save" or "Cancel" button. Since both of these buttons appear on the same screen, these terms are said to conflict. In the present invention, conflicting terms must not use the same accelerator. For example, if "Save" and "Cancel" both use the "a" as the accelerator, then the system will not be able to execute the command because of the ambiguity. Table 3 shows a simplified representation of the conflicts database.

TABLE 3

| Translation Code #1 | Translation Code #2 |
|---|---|
| 123 | 125 |
| 123 | 137 |
| 125 | 137 |

The conflicts database is pre-defined and is a complete list of all conflict pairs in the console program application. Carrying through with the above example, terms 125 ("Save") and 137 ("Cancel") conflict because both terms appear on a common menu/screen within the console application. When the system administrator is creating or modifying a custom language, the conflicts database is used to identify when an accelerator conflict exists so that the administrator can then resolve the conflict by changing assignments.

The interaction of the three databases in the present invention can be understood in light of a summary of the steps for creating a new custom language previously described. For example, by naming a language using the custom language development function of the present invention, an entry is added to the language database. In specifying translations for each of the accelerator-driven and non-accelerator-driven terms, new entries are then added to the translation database subject to a check for accelerator conflicts as defined by the conflicts database.

In operation, the database implementation of the present invention is utilized any time the user accesses one of the previously described functions of the PC-based attendant console (i.e., custom language development, privileged operations, or attendant operations). For example, if a system administrator is using the privileged operations function of the present invention, the PC-based attendant console application program will be prompting the administrator at various points for input and commands. If the application program requires the administrator to store an entry during operation of the program, then the program may need to prompt the administrator to either "Save" or "Cancel" the entry. In order to display this information to the administrator in the correct language (i.e., based on the language code that is assigned to that particular administrator in his or her profile), the present invention executes a series of "look-ups" using the three databases. In particular, the administrator's language code will already be assigned in his or her profile based on the possible entries from the language database. The proper translation strings for the "Save" and "Cancel" entries are then identified by looking up the translation codes (e.g., 125 for "Save", 137 for "Cancel") that correspond to the administrator's language code (e.g., 01 for a French user) in the translations database. The administrator is then presented with the appropriate button labels "Mem" and "Annuler" accordingly. Therefore, the present invention is accessing the databases any time a user is to be presented with a command, status or error message, button label, etc. while that user is utilizing the various functions of the console application program.

By using the foregoing steps of the present invention, a custom language can be created efficiently and expediently without the limitations of the prior art systems. Specifically, the present invention provides a more versatile approach for creating custom languages that are derivatives of existing standard languages without having to use a separate customized database for each custom language. Furthermore, the present invention can be used in a dynamic environment in which a custom language is created at any point during system operation as opposed to having to pre-program the entire system in advance (i.e., pre-loading new languages in the database, adding rules, etc.) to accommodate the new rules and syntax of a newly created custom language.

Another aspect of the present invention provides a capability to change the language selection pertaining to a particular attendant's profile either on a temporary basis for the duration of the particular attendant's login session or on a permanent basis. In both cases, this capability can be characterized as dynamic updating because changes can be made while the attendant console target application is running. In a typical console operation, the permanent changes are normally reserved for the system administrators while the temporary changes (i.e., during the active session only) are normally available to both the individual attendants as well as the administrators. In the present invention, the permanent changes are implemented through the use of the privileged operations function 112 and the temporary changes are implemented through the use of the attendant operations function 113 (FIG. 1).

More specifically, the system administrator is provided with the capability to dynamically manage individual attendant profiles by first selecting a particular attendant profile from a listing of all attendants. The profile data for that particular attendant is then displayed to include the language selection for the individual attendant's profile. The language selection for the selected attendant profile can be changed so that all labels, status messages, error messages, and the like will be repainted with the newly selected language once the attendant logs into the system. The language change is effective immediately upon being saved into memory. Using this feature of the present invention, the administrator can select from the list of any of the completed languages entered in the system or, alternatively, the administrator can create a new custom language as previously described.

Another aspect of the invention provides an attendant with the ability to select and dynamically change the particular language associated with his or her assigned profile by using the attendant operations function 113 (FIG. 1).

More specifically, an attendant can select from the list of any of the completed languages entered in the system. The present invention will not allow an attendant to select an incomplete language (i.e., without all required translations). With the attendant operations feature of the present invention, the attendant's changes are effective immediately upon being saved and any such changes made will last for the duration of the current session (i.e., until logout or exit).

The attendant operations feature differs from the privileged operations feature in that the former is how an individual attendant can temporarily change his or her personal profile during a particular session, while the latter is how the administrator creates, deletes, or edits any attendant's profile for all subsequent sessions. More specifically, the administrator is using privileged operations to maintain official user profiles, and any changes made by individual attendants will not be permanently entered into the system. For example, if an attendant executes a login and modifies his or her profile, these profile changes will only be valid during the particular login session. Conversely, if the profile is modified by the administrator during a privileged operations login, then the modified version of the profile will be maintained for subsequent logins by the users. It should be noted that this particular implementation is typically used in a PC-based console system so that some degree of centralized control can be maintained over the system. Therefore, one skilled in the art will realize that other suitable implementations are possible without departing from the spirit and scope of the present invention. For example, this capability may also be useful for computer-based environments in which it is desirable for the system administrators (e.g., network administrators, computer support staffs, etc.) to maintain centralized control over the computers in the network. Using this approach, a single computer on the network can be shared by multiple users using different languages, since the individual network users can locally and temporarily change their language selection during their session only on the computer.

In the present invention, dynamic changes can be simultaneously made to the language selections for more than one attendant without interfering with the operation of the system. For example, in one embodiment of the present invention, a network of PCs can be "attending" the switch simultaneously with several attendants logged into the system (one at each PC). Each of the attendants can change his or her language selection using the steps previously described for attendant operations. Consequently, the multiple language capability according to the present invention supports dynamic and simultaneous changes to the language selections without the need for a complicated pre-programming scheme or system-wide changes to a global database as is the case with the prior art systems.

In operation, a user would access a system using the console target application login procedures. Generally, the login procedures include a user name and password. In one particular embodiment, the login procedures can be structured with multi-level system access so that the user is prompted initially to enter the system with an administrator password (i.e., higher level privileges) or with an attendant password (lower level privileges). An administrator, upon login, would gain full access to all attendant profiles and would be able to use all features of the present invention, including custom language development and permanent profile changes. An attendant, upon login, would only be presented with his or her particular profile and would be limited to changing the language selection using the list of completed languages. Because each login session is unique to that particular attendant, the present invention therefore provides the capability to support multiple users on a simultaneous basis as previously described.

Numerous modifications and alternative embodiments of the invention will be apparent to those skilled in the art in view of the foregoing description and drawings. Accordingly, this description is to be construed as illustrative only and is for the purpose of teaching those skilled in the art the best mode of carrying out the invention. Details of the present invention may be varied substantially without departing from the spirit of the invention and the exclusive use of all modifications which come within the scope of the appended claims is reserved.

What is claimed is:

1. A method of operating a computer-based system in multiple languages, said computer-based system having a processor and memory for executing a target application, said method comprising the steps of:

storing selected segments of at least one pre-programmed language in said memory of said computer-based system, said selected segments being representative of a fixed set of terms used for communicating with said computer-based system via said target application;

retrieving a profile from said memory for at least one of a plurality of users of said computer-based system, said profile including a current language selection for said at least one of a plurality of users;

displaying said current language selection for said at least one of a plurality of users;

modifying said current language selection to produce a new language selection during operation of said target application, said modifying step being independently performable by one of a plurality of users; and updating said profile with said new language selection during operation of said target application, said at least one of a plurality of users using said new language selection for operating said computer-based system via said target application;

wherein said modifying step comprises creating a custom language and said updating step comprises storing selected segments of said custom language in said memory of said computer-based system, said selected segments of said custom language being representative of said fixed set of terms used for communicating with said computer-based system via said target application.

2. The method according to claim 1, wherein said step of creating a custom language comprises the steps of:

assigning naming parameters for said custom language;

translating accelerator-driven terms, said accelerator-driven terms being representative of a given number of said fixed set of terms used for communicating with said computer-based system via corresponding compressed keyboard sequences; and translating non-accelerator-driven terms.

3. The method according to claim 2, wherein said step of assigning naming parameters includes:

creating a name for said custom language;

selecting one of said at least one pre-programmed languages for a system help function; and initializing default translations for said accelerator-driven and non-accelerator-driven terms.

4. The method according to claim 3, wherein said initializing step includes selecting one of said at least one pre-programmed languages for said default translations.

5. The method according to claim 2, wherein said step of translating accelerator-driven terms includes:
   creating textual translations for each of said accelerator-driven terms; and
   assigning a unique compressed keyboard sequence corresponding to each of said textual translations, wherein said unique compressed keyboard sequence is operable to execute a command in said target application of said computer-based system.

6. The method according to claim 5, further comprising the steps of:
   checking for a conflict among said unique assignments, said conflict being represented by a duplicative assignment for accelerator-driven terms appearing simultaneously in a common menu of said target application; and
   prompting said at least one of a plurality of users to reassign a unique compressed keyboard sequence to remove said conflict.

7. The method according to claim 3, wherein said custom language is a modified derivative of one of said at least one pre-programmed languages, wherein said step of initializing default translations includes selecting one of said at least one pre-programmed languages as a default language for said default translations for said accelerator-driven and non-accelerator-driven terms, and further including the step of selectively modifying said default translations for said custom language.

8. The method according to claim 1, wherein said selected segments of said at least one pre-programmed language and said selected segments of said custom language are stored in a database in said memory.

9. The method according to claim 2, wherein said modifying step comprises creating a custom language and said updating step comprises storing selected segments of said custom language in said memory of said computer-based attendant console, wherein said selected segments of said custom language are representative of said fixed set of terms used for attending said communications switching system via said computer-based attendant console using said console application program.

10. The method according to claim 9, further comprising the step of deleting a previously created custom language, wherein said new language selection is selected from the group consisting of said at least one pre-programmed language and another previously created custom language, wherein said new language selection is representative of a complete language having all required translations.

11. The method according to claim 9, wherein said step of creating a custom language comprises the steps of:
   assigning naming parameters for said custom language;
   translating accelerator-driven terms, said accelerator-driven terms being representative of a given number of said fixed set of terms used for communicating with said communications switching system via corresponding compressed keyboard sequences entered by said at least one of a plurality of attendants; and
   translating non-accelerator-driven terms.

12. The method according to claim 11, wherein said step of assigning naming parameters includes:
   creating a name for said custom language;
   selecting one of said at least one pre-programmed languages for a system help function; and
   initializing default translations for said accelerator-driven and non-accelerator-driven terms.

13. The method according to claim 12, wherein said initializing step includes selecting one of said at least one pre-programmed languages for said default translations.

14. The method according to claim 11, wherein said step of translating accelerator-driven terms includes:
   creating textual translations for each of said accelerator-driven terms; and
   assigning a unique compressed keyboard sequence corresponding to each of said textual translations, wherein said unique compressed keyboard sequence is operable to execute a command in said console application program of said computer-based attendant console.

15. The method according to claim 14, further comprising the steps of:
   checking for a conflict among said unique assignments, said conflict being represented by a duplicative assignment for accelerator-driven terms appearing simultaneously in a common menu of said console application program; and
   prompting said at least one of a plurality of attendants to reassign a unique compressed keyboard sequence to remove said conflict.

16. The method according to claim 12, wherein said custom language is a modified derivative of one of said at least one pre-programmed languages, wherein said step of initializing default translations includes selecting one of said at least one pre-programmed languages as a default language for said default translations for said accelerator-driven and non-accelerator-driven terms, and further including the step of selectively modifying said default translations for said custom language.

17. The method according to claim 9, wherein said selected segments of said at least one pre-programmed language and said selected segments of said custom language are stored in a database in said memory.

18. The system according to claim 2, wherein said computer program includes a program segment for creating said custom language, said program segment being operable to assign naming parameters for said custom language, said program segment being further operable to translate accelerator-driven terms and non-accelerator-driven terms, said accelerator-driven terms being representative of a given number of said fixed set of terms having corresponding compressed keyboard sequences.

19. The system according to claim 18, wherein said program segment is operable to assign naming parameters by creating a name for said custom language, by selecting one of said at least one pre-programmed languages for a system help function, and by initializing default translations for said accelerator-driven and non-accelerator-driven terms.

20. The system according to claim 19, wherein said program segment is operable to select one of said at least one pre-programmed languages for said default translations.

21. The system according to claim 19, wherein said program segment is operable to translate accelerator-driven terms by creating textual translations for each of said accelerator-driven terms, and by assigning a unique compressed keyboard sequence corresponding to each of said textual translations, wherein said unique compressed keyboard sequence is used to execute a command in said computer-based application.

22. The system according to claim 19, wherein said custom language is a modified derivative of one of said at least one pre-programed languages, wherein said program segment is operable to select one of said at least one pre-programmed languages as a default language for said accelerator-driven and non-accelerator-driven terms, and wherein said program segment is further operable to selectively modify said default translations for said custom language.

23. The system according to claim 2, wherein said computer program includes a program segment for creating said custom language, said program segment being operable to assign naming parameters for said custom language, said program segment being further operable to translate accelerator-driven terms and non-accelerator-driven terms, said accelerator-driven terms being representative of a given number of said fixed set of terms having corresponding compressed keyboard sequences.

24. The system according to claim 23, wherein said program segment is operable to assign naming parameters by creating a name for said custom language, by selecting one of said at least one pre-programmed languages for a system help function, and by initializing default translations for said accelerator-driven and non-accelerator-driven terms.

25. The system according to claim 24, wherein said program segment is operable to select one of said at least one pre-programmed languages for said default translations.

26. The system according to claim 24, wherein said program segment is operable to translate accelerator-driven terms by creating textual translations for each of said accelerator-driven terms, and by assigning a unique compressed keyboard sequence corresponding to each of said textual translations, wherein said unique compressed keyboard sequence is used to execute a command in said computer-based attendant console.

27. The system according to claim 24, wherein said custom language is a modified derivative of one of said at least one pre-programmed languages, wherein said program segment is operable to select one of said at least one pre-programmed languages as a default language for said accelerator-driven and non-accelerator-driven terms and wherein said program segment is further operable to selectively modify said default translations for said custom language.

28. The system according to claim 23, further comprising a plurality of databases stored in said memory, wherein said selected segments of said at least one pre-programmed language and said selected segments of said custom language are stored in said plurality of databases.

29. The system according to claim 28 wherein said plurality of databases includes:
  a language database for storing a language name and a corresponding language code for each said at least one pre-programmed language and each said custom language;
  a translation database for storing a unique translation code and a corresponding translation string for each term in said fixed set of terms, wherein said translation strings contain said selected segments of said at least one pre-programmed language and said textual translations for said accelerator-driven and said non-accelerator-driven terms for each said custom language, and wherein said translation database stores each said translation code and corresponding translation string according to said language code for each said at least one pre-programmed language and each said custom language; and
  a conflicts database for storing pairs of said translation codes for said accelerator-driven terms that appear simultaneously in common menus of said attendant console.

30. A method of operating a computer-based system in multiple languages, said computer-based system having a processor and memory for executing a target application, said method comprising the steps of:
  storing selected segments of at least one pre-programmed language in said memory of said computer-based system, said selected segments being representative of a fixed set of terms used for communicating with said computer-based system via said target application;
  retrieving a profile from said memory for at least one of a plurality of users of said computer-based system, said profile including a current language selection for said at least one of a plurality of users;
  displaying said current language selection for said at least one of a plurality of users;
  modifying said current language selection to produce a new language selection during operation of said target application;
  updating said profile with said new language selection during operation of said target application, said at least one of a plurality of users using said new language selection for operating said computer-based system via said target application;
  creating a custom language; and
  storing selected segments of said custom language in said memory of said computer-based system, said selected segments of said custom language being representative of said fixed set of terms used for communicating with said computer-based system via said target application.

31. The method in claim 30, further comprising the steps of:
  assigning naming parameters for said custom language;
  translating accelerator-driven terms, said accelerator-driven terms being representative of a given number of said fixed set of terms used for communicating with said computer-based system via corresponding compressed keyboard sequences; and
  translating non-accelerator-driven terms.

32. The method in claim 31, further comprising the steps of:
  creating a name for said custom language;
  selecting one of said at least one pre-programmed languages for a system help function; and
  initializing default translations for said accelerator-driven and non-accelerator-driven terms.

33. A system for providing multiple language capability in a computer-based application, comprising:
  a programmable computer having a processor and memory, said programmable computer being operable to store selected segments of at least one pre-programmed language in said memory, said selected segments being representative of a fixed set of terms used for communicating with said computer-based application; and
  a computer program executable by said processor, said computer program being operable to retrieve a profile from said memory for at least one of a plurality of users of said computer-based application, said profile including a current language selection for said at least one of a plurality of users, said computer program being operable to display said current language selection, said computer program being further operable to modify said current language selection to produce a new language selection during operation of said computer-based application, said computer program being further operable to update said profile with said new language selection during operation of said computer-based application, said new language selection being stored in said memory, wherein said at least one of a plurality of users operates said computer-based application using said new language selection;

wherein said computer program includes a program segment for creating a custom language, said program segment being operable to assign naming parameters for said custom language, said program segment being further operable to translate accelerator-driven terms and non-accelerator driven terms, said accelerator-driven terms being representative of a given number of said fixed terms having corresponding compressed keyboard sequences.

34. The system in claim 33, wherein said program segment is operable to assign naming parameters by creating a name for said custom language, by selecting one of said at least one pre-programmed languages for a system help function, and by initializing default translations for said accelerator-driven and non-accelerator-driven terms.

35. The system in claim 34, wherein said program segment is operable to select one of at least one pre-programmed languages for said default translations.

* * * * *